(12) United States Patent
Ganteaume

(10) Patent No.: US 11,231,965 B2
(45) Date of Patent: *Jan. 25, 2022

(54) SYSTEMS AND METHODS FOR CLOUD COMPUTING DATA PROCESSING

(71) Applicant: LGS Innovations LLC, Herndon, VA (US)

(72) Inventor: Oscar E. Ganteaume, Falls Church, VA (US)

( * ) Notice: Subject to any disclaimer, the term of this patent is extended or adjusted under 35 U.S.C. 154(b) by 165 days.

This patent is subject to a terminal disclaimer.

(21) Appl. No.: 15/984,868

(22) Filed: May 21, 2018

(65) Prior Publication Data
US 2019/0340031 A1     Nov. 7, 2019

Related U.S. Application Data

(63) Continuation of application No. 15/969,839, filed on May 3, 2018.

(51) Int. Cl.
*G06F 9/50*        (2006.01)
*H04L 29/08*     (2006.01)
(Continued)

(52) U.S. Cl.
CPC ........ *G06F 9/5038* (2013.01); *G06F 16/3344* (2019.01); *G06F 40/30* (2020.01); *G10L 15/22* (2013.01); *G10L 15/26* (2013.01); *G10L 15/34* (2013.01); *H04L 67/10* (2013.01); *G06F 9/541* (2013.01); *G10L 2015/088* (2013.01); *G10L 2015/223* (2013.01); *H04L 41/0806* (2013.01); *H04L 41/0869* (2013.01); *H04L 67/12* (2013.01)

(58) Field of Classification Search
None
See application file for complete search history.

(56) References Cited

U.S. PATENT DOCUMENTS 4,969,092 A    11/1990   Shorter
D607,463 S     1/2010   Krieter et al.
(Continued)

FOREIGN PATENT DOCUMENTS

WO     WO-2017161329 A1 *   9/2017          H04L 41/5054

OTHER PUBLICATIONS

Srirama, S. N. et al. Jun. 27, 2016. Dynamic deployment and auto-scaling enterprise applications on the heterogeneous cloud. In 2016 IEEE 9th International Conference on Cloud Computing (CLOUD) (pp. 927-932). IEEE. (Year: 2016).

*Primary Examiner* — Lewis A Bullock, Jr.
*Assistant Examiner* — Gilles R Kepnang
(74) *Attorney, Agent, or Firm* — BakerHostetler

(57) ABSTRACT

Systems and methods allow users to leverage multiple disparate cloud solutions, offered by disparate service providers, in a unified and cohesive manner. A system includes an image database configured to store a virtual machine image in a stored image format and an engine configured to allocate a task among two or more disparate cloud services. The engine is further configured to convert the virtual machine image from the stored image format to a deployed image format, wherein the deployed image format conforms to formatting for one of the two or more disparate cloud services, and deploy the virtual machine image in the deployed image format to a virtual machine instance of the one of the two or more disparate cloud services.

20 Claims, 10 Drawing Sheets

(51) Int. Cl.
  H04L 12/24  (2006.01)
  G06F 9/54  (2006.01)
  G06F 16/33  (2019.01)
  G10L 15/22  (2006.01)
  G06F 40/30  (2020.01)
  G10L 15/26  (2006.01)
  G10L 15/34  (2013.01)
  G10L 15/08  (2006.01)

(56) References Cited

U.S. PATENT DOCUMENTS

| | | | |
|---|---|---|---|
| D694,259 S | 11/2013 | Klein | |
| 8,631,458 B1 | 1/2014 | Banerjee | |
| 9,712,510 B2 * | 7/2017 | Vinnik | H04L 63/08 |
| 9,715,400 B1 * | 7/2017 | Sethuramalingam | G06F 9/44505 |
| 9,860,569 B1 | 1/2018 | Wilms et al. | |
| 9,923,785 B1 * | 3/2018 | Li | H04L 41/5025 |
| 10,110,600 B1 | 10/2018 | Simca | |
| D836,120 S | 12/2018 | Dudey | |
| D842,313 S | 3/2019 | Kagan et al. | |
| D851,669 S | 6/2019 | Baldi et al. | |
| 10,346,188 B1 * | 7/2019 | Christensen | G06F 9/5033 |
| 10,454,795 B1 | 10/2019 | Jonsson et al. | |
| D869,491 S | 12/2019 | Bachman et al. | |
| D872,121 S | 1/2020 | Einspahr et al. | |
| 10,545,951 B1 | 1/2020 | Lieberman | |
| 2005/0120160 A1 | 6/2005 | Plouffe et al. | |
| 2009/0024940 A1 | 1/2009 | Zeringue et al. | |
| 2011/0078303 A1 | 3/2011 | Li et al. | |
| 2012/0290460 A1 * | 11/2012 | Curry, Jr. | G06Q 40/04 705/37 |
| 2013/0007753 A1 | 1/2013 | Jain | |
| 2013/0211870 A1 | 8/2013 | Lawson et al. | |
| 2013/0212129 A1 | 8/2013 | Lawson et al. | |
| 2013/0212507 A1 | 8/2013 | Fedoseyeva et al. | |
| 2013/0238772 A1 | 9/2013 | Armour et al. | |
| 2013/0283263 A1 | 10/2013 | Elemary | |
| 2013/0290694 A1 * | 10/2013 | Civilini | H04L 41/0806 713/2 |
| 2013/0318527 A1 | 11/2013 | Tamura | |
| 2014/0137073 A1 | 5/2014 | Dees et al. | |
| 2015/0134424 A1 | 5/2015 | Matzlavi et al. | |
| 2015/0163285 A1 | 6/2015 | Chakra et al. | |
| 2015/0261514 A1 | 9/2015 | Fu et al. | |
| 2015/0295731 A1 | 10/2015 | Bagepalli et al. | |
| 2015/0304231 A1 | 10/2015 | Gupte et al. | |
| 2015/0309769 A1 | 10/2015 | Greene et al. | |
| 2015/0341469 A1 * | 11/2015 | Lawson | H04L 67/16 709/203 |
| 2016/0094483 A1 * | 3/2016 | Johnston | G06F 8/65 709/226 |
| 2016/0134932 A1 * | 5/2016 | Karp | H04L 67/22 348/155 |
| 2016/0378450 A1 | 12/2016 | Fu et al. | |
| 2017/0024260 A1 | 1/2017 | Chandrasekaran et al. | |
| 2017/0026355 A1 * | 1/2017 | Mathaiyan | G06F 9/5072 |
| 2017/0041342 A1 * | 2/2017 | Efremov | H04L 67/1097 |
| 2017/0104755 A1 * | 4/2017 | Arregoces | H04L 63/104 |
| 2017/0366373 A1 | 12/2017 | Bagepalli et al. | |
| 2018/0004553 A1 * | 1/2018 | Wagner | G06F 9/5077 |
| 2018/0032203 A1 | 2/2018 | Sepulveda et al. | |
| 2018/0183578 A1 * | 6/2018 | Chakrabarti | H04L 9/0861 |
| 2018/0219740 A1 | 8/2018 | Kamath et al. | |
| 2018/0225103 A1 | 8/2018 | Krishnan et al. | |
| 2018/0225266 A1 | 8/2018 | White et al. | |
| 2018/0316552 A1 | 11/2018 | Subramani et al. | |
| 2018/0316751 A1 | 11/2018 | Shen et al. | |
| 2018/0336285 A1 | 11/2018 | Amdur et al. | |
| 2018/0341927 A1 | 11/2018 | Agarwal et al. | |
| 2018/0359162 A1 | 12/2018 | Savov et al. | |
| 2018/0367434 A1 | 12/2018 | Kushmerick et al. | |
| 2019/0102098 A1 | 4/2019 | Biswas et al. | |
| 2019/0104032 A1 * | 4/2019 | Du | H04L 41/5054 |
| 2019/0179725 A1 | 6/2019 | Mital et al. | |
| 2019/0220315 A1 | 7/2019 | Vallala et al. | |
| 2019/0222988 A1 | 7/2019 | Maes et al. | |
| 2019/0303018 A1 | 10/2019 | Huang et al. | |

* cited by examiner

SYSTEMS AND METHODS FOR CLOUD COMPUTING DATA PROCESSING

CROSS-REFERENCE TO RELATED APPLICATION

This application claims the benefit of and priority to U.S. patent application Ser. No. 15/969,839, filed May 3, 2018, the entirety of which is incorporated herein by reference.

TECHNICAL FIELD

This disclosure relates generally to network management and, more specifically, to utilizing multiple cloud services.

BACKGROUND

Cloud services providers deliver powerful capabilities which enable users to easily access computing resources at a cost. Processing, storage, content delivery, and other local and network functions benefit from the sharing-based economies of scale produced using cloud technology.

The complexity required to efficiently utilize cloud services can inhibit some companies and individuals from taking advantage of all the benefits that cloud services provide. Learning the complexity and investing in utilizing a particular cloud service solution also "locks in" users to a particular environment, decreasing flexibility and competition.

This disclosure is directed to solving one or more of the problems in the existing technology.

SUMMARY

In an aspect, a cloud service management system comprises an image database configured to store a virtual machine image in a stored image format and an engine configured to allocate a task among two or more disparate cloud services. The two or more disparate cloud services include a dedicated solution and a shared solution. The engine is further configured to convert the virtual machine image from the stored image format to a deployed image format, wherein the deployed image format conforms to formatting for one of the two or more disparate cloud services and deploy the virtual machine image in the deployed image format to a virtual machine instance of the one of the two or more disparate cloud services.

In another aspect, a method comprises converting a virtual machine image from a stored image format to a deployed image format and deploying the virtual machine image in the deployed image format to a virtual machine instance of one of two or more disparate cloud services. The two or more disparate cloud services include a dedicated solution and a shared solution, and the deployed image format conforms to formatting for the one of the two or more disparate cloud services.

According to yet another aspect, a non-transitory computer readable media stores instructions. The instructions, when executed by a processor, are configured to perform operations comprising converting a virtual machine image from a stored image format to a deployed image format and deploying the virtual machine image in the deployed image format to a virtual machine instance of one of two or more disparate cloud services. The two or more disparate cloud services include a dedicated solution and a shared solution, and the deployed image format conforms to formatting for the one of the two or more disparate cloud services.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
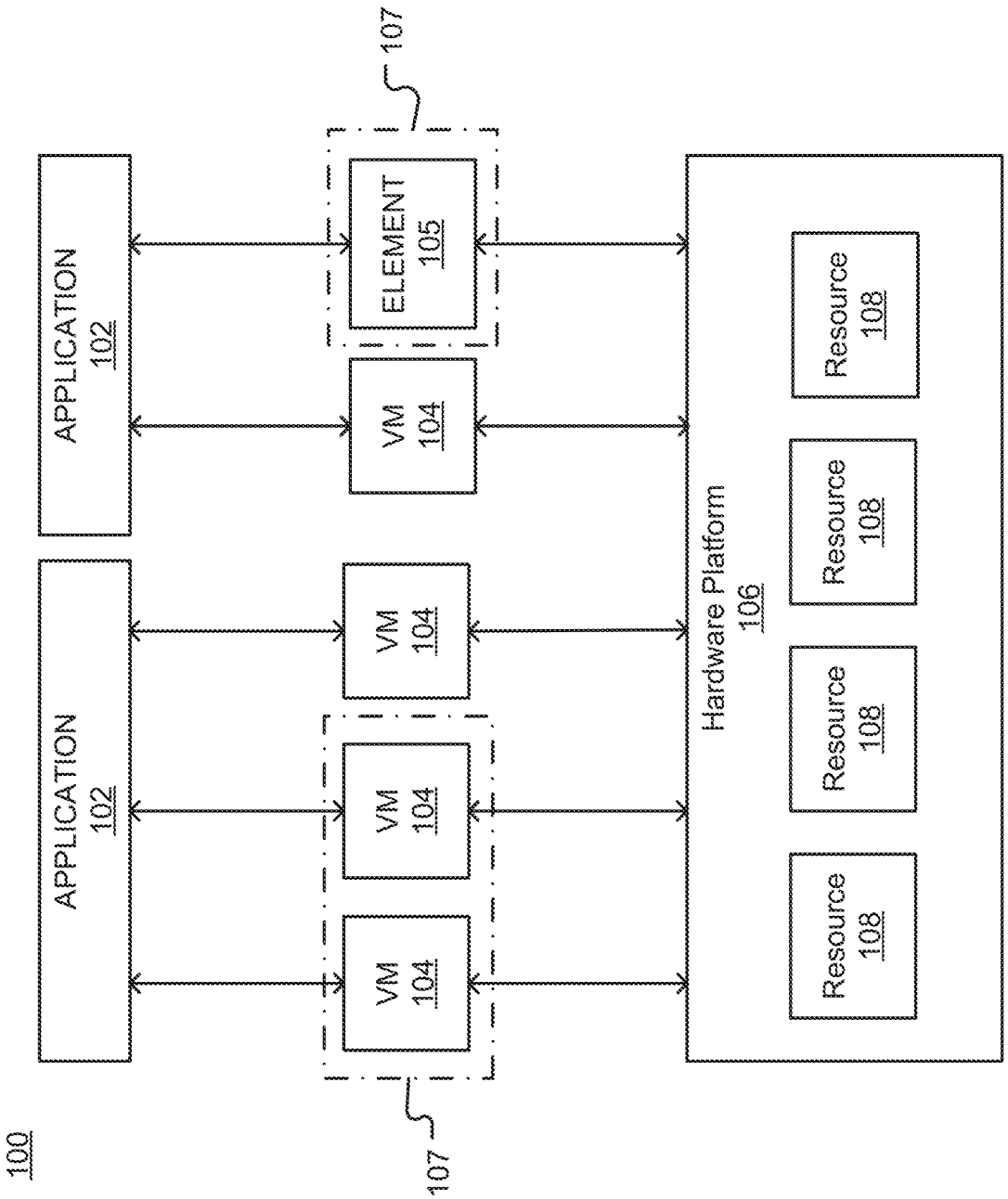
FIG. 1A is a representation of an example network.

As discussed above, cloud services provide massive resources to all types of users, but often require specialized knowledge to leverage. Accordingly, aspects herein facilitate the use of cloud services by mitigating its inherent complexity in an unconventional manner. Aspects disclosed allow users to create, modify, remove, and launch tasks without having to know how they are executed in the cloud, and in a manner which allows interoperability between cloud service providers and/or their own servers. This diverges from conventional techniques which requires detailed configuration pursuant to proprietary requirements for each type of cloud service based on the manner in which each type of cloud service initializes resources and handles tasks.

While utilization of cloud service is increasingly common, routine techniques typically involve use of a single cloud service. After implementing task accomplishment in one cloud service, it would be difficult for many users to understand how to achieve the same effects in a different cloud service. The disclosure provides for "translating" between cloud services by consolidating parameters required by available cloud services in a single database and possessing an engine configured to access the fields of the database to prepare information matching both the form and substance for a given cloud service. This obviates the need to create and implement custom virtual machine controllers as well as create implementations for storage controller interfaces in each service. More, the disclosure facilitates combining multiple disparate cloud services when allocating one or more tasks using a running mode technique. Operational data can be collected from various virtual machines in different cloud services without complex processes, and the disclosed techniques eliminate the need for dependency on cloud service libraries or tools and other proprietary or custom development requirements.

As used herein, a cloud service is any service, function, or provider of or for cloud resources used to perform tasks in a cloud environment, e.g., providing capability for Software as a Service (SaaS), Platform as a Service (PaaS), Database as a Service (DBaaS), Infrastructure as a Service (IaaS), et cetera. Cloud services may utilize virtualization to variously allocate or partition processing power (e.g., compute resources storage, and networking services or resources according to the needs of a particular cloud user or customer on-demand. Cloud services discussed herein include dedicated cloud solutions and shared cloud solutions. References to disparate or different cloud services similar language) indicate two or more cloud services of different types. This could include arrangements with at least one dedicated cloud solution and at least one shared cloud solution; two dedicated cloud solutions of different implementation (e.g., different operating systems or architectures); two shared cloud solutions of different implementation (e.g., two or more of Microsoft Azure, Google Cloud, Amazon Web Services, Alibaba Cloud, IBM cloud services, Oracle cloud services, Samsung cloud services, CenturyLink Cloud, et cetera); and others.

Dedicated cloud solutions use virtual machines under the control of the party utilizing the cloud service. These virtual machines are instantiated, imaged, and terminated according to the user, who may also own or control the resources associated with such virtual machines. The party sends tasks directly to these virtual machines under their control.

Shared cloud solutions are those managed by the cloud service provider. Rather than control the virtual machines and available resources, users or customers provide tasks (or information for running tasks) to a gateway endpoint pre-configured to run the tasks using resources available from the shared cloud solution provider. In one example, Amazon Web Services (AWS) describes such tasks as "lambda functions."

To run a task using resources managed by the cloud service, information about the task must be provided to a virtual machine on the cloud service capable of handling the task. This information is called "task parameters" herein. Task parameters may be received in a variety of manners, and may be received as "task input" prior to being organized, formatted, encoded, transformed, et cetera, into the parametric arrangement used by cloud computing data processing systems and methods disclosed herein and the virtual machines of disparate cloud services used in conjunction therewith. Task parameters can include common parameters and proprietary parameters. Common parameters include those which are used for two or more distinct cloud services, or which are used by a cloud computing data processing system or method disclosed herein. Proprietary parameters include those which are specific to a particular cloud service. In embodiments, the same parameter can be expressed differently based on encoding or formatting. Accordingly, cloud computing data processing systems and methods disclosed herein can encode, format, translate, convert, or otherwise transform input or information related to a task to a standard field for consistent storage of task parameters and to facilitate tasks which are input in one manner to be available for running on cloud services which accept tasks in a different manner.

Turning to the drawings. FIG. 1A is a representation of an example network 100. Network 100 may include one or more applications (which in turn may include tasks run on virtual machines (VMs) or virtual network functions (NAB)) implemented on general purpose hardware, such as in lieu of having dedicated hardware for every network function. That is, general purpose hardware of network 100 may be configured to run applications. In embodiments, general purpose hardware may be combined with special purpose hardware, within hardware platform 106, embodied as element 105, or distributed elsewhere within a network to which elements of FIG. 1A are communicatively coupled, to achieve particular functionality.

Each application 102 may use one or more VMs 104 or elements 105 to operate. Each VM 104 may have a VM type that indicates its functionality or role. Tasks may be handled by applications, may be applications themselves, or may be processes involving multiple applications or processes not conventionally considered to be applications (e.g., providing file access). Examples of VMs 104 used in administering the cloud may include gateways (GWs), firewalls (FW), routers, real-time analytics, customer edges (vCEs), provider edges (vPEs), proxies, rendezvous points (RPs) or the like. Other VMs may be provided to provide resources to cloud customers or users. Each element 105 may have an element type that indicates is functionality or role. Examples of elements 105 used in administering the cloud include an ingress point, an egress point, a non-virtualized function, or the like. While specific reference may be made to VMs 104 or groups (which may include one or more elements 105), this is for explanation to show that the deployment plan may not necessarily limited to virtual components in all implementations. As noted earlier, while VMs are discussed for ease and consistency of explanation, this focus may be substituted by or supplemented with focus on containers. For example, one or more of VMs 104 or elements 105 can be a container. Similarly, various clients can be substituted for or comprise application 102, including but not limited to databases, webservers, media transcoders, other cloud applications, et cetera, and any tasks contemplated for allocation herein.

Each VM 104 may consume various network resources from a hardware platform 106, such as resources 108. For example, resources 108 may include one or more virtual central processing units (vCPUs), memory, or a network interface cards (NIC). Resources 108 can be dedicated or commingled in support of one or more VM 104, with such utilization or assignment being performed dynamically, and need not conform to any particular arrangement (e.g., multiple CPUs can support one VM, multiple VMs can be supported by one CPU, et cetera). Various rules can be used in such allocation.

Figure 1B:
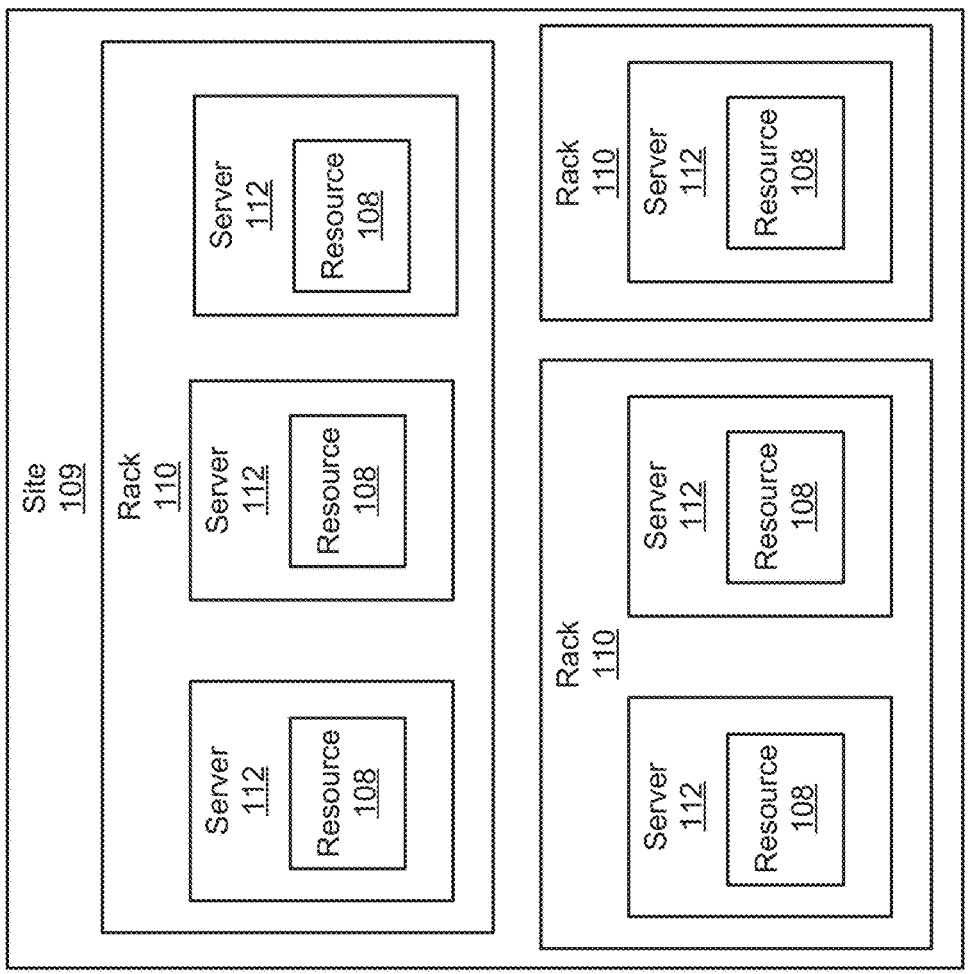
FIG. 1B is a representation of an example hardware platform for a network.
Figure 1B:
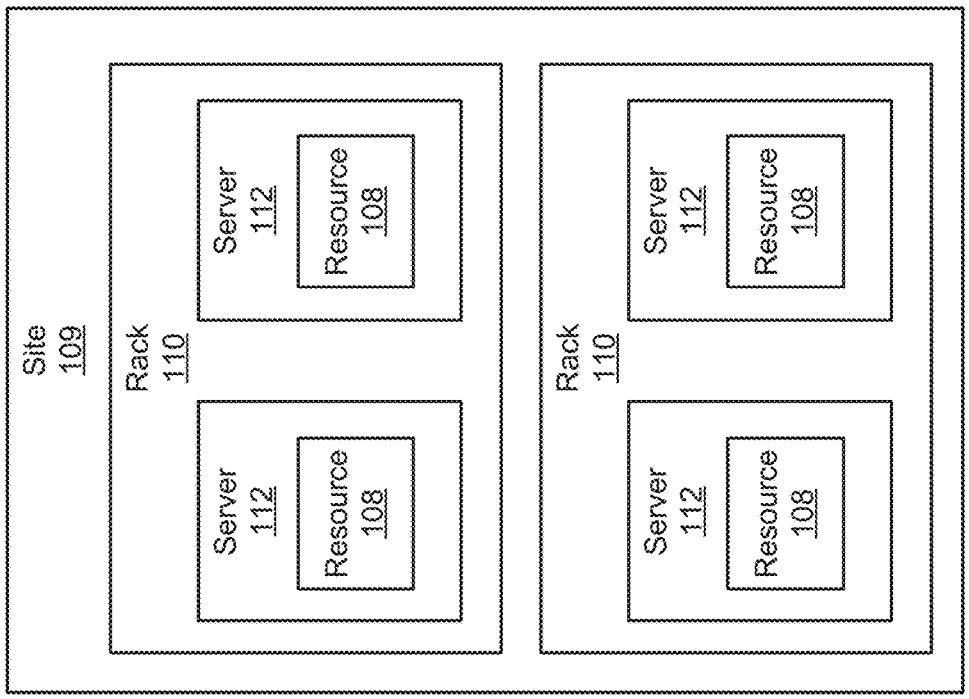

While FIG. 1A illustrates resources 108 as collectively contained in hardware platform 106, the configuration of hardware platform 106 may be further delineated. FIG. 1B provides an example implementation of hardware platform 106.

Hardware platform 106 may comprise one or more sites 109. For example, a site 109 may be a room, building, or geographic location in which resources 108 are located. For example, site 109 may be a datacenter. Each site 109 may comprise one or more racks 110. In an aspect, rack 110 may refer to the physical housing or platform for multiple servers or other network equipment. In an aspect, rack 110 may also refer to the underlying network equipment. Each rack 110 may include one or more servers 112, Server 112 may comprise general purpose computer hardware or a computer. In an aspect, rack 110 may comprise a metal rack, and servers 112 of rack 110 may comprise blade servers that are physically mounted in or on rack 110.

Each server 112 may include one or more network resources 108, as illustrated. Servers 112 may be communicatively coupled together (not shown) in any combination or arrangement. For example, all servers 112 within a given site 109 or rack 110 may be communicatively coupled. As another example, servers 112 in different racks 110 may be communicatively coupled. Additionally or alternatively, racks 110 may be communicatively coupled together (not shown) in any combination or arrangement.

The characteristics of each site 109, rack 110, and server 112 may differ. For example, the number of racks 110 within two sites 109 may vary, or the number of servers 112 within two racks 110 may vary. Additionally or alternatively, the type or number of resources 108 within each server 112 may vary. In an aspect, rack 110 may be used to group servers 112 with the same resource characteristics. In another aspect, servers 112 within the same rack 110 may have different resource characteristics.

A single application 102 may include many functional components (e.g., VMs 104 and elements 105. These components may have dependencies upon each other and intercommunication patterns with certain quality of service (QoS) requirements, such as locality, high availability, and security. Consequently, placement decisions that is, decisions on how (and where) to implement VMs 104 and other elements 105 within hardware platform 106 may be based on all VMs 104 in which the components of application 102 run, including the dependencies of those VMs 104, holistically.

Such QoS requirements may be domain or application specific. Thus, a deployment plan for assigning resources 108 to VMs 104 of an application may depend upon certain limitations and requirements of both network 100 and application 102, such as the QoS requirements of a given application 102 and the underlying infrastructure of network 100. As all of this information is not typically accessible to both the application provider (that may not have access to network infrastructure details) and the cloud provider (that may not have access to the functionality of application 102), an abstraction may be used to create a deployment plan for application 102, where creation of the deployment plan can occur without knowledge or consideration of the specific infrastructure information.

A deployment plan may assign VMs 104 to particular resources 108 in accordance with one or more rules in order to account for the requirements of application 102 supported by such VMs 104. These rules may be based on abstracting the requirements of application 102, such as by levering the application provider's knowledge on its application 102 to yield a concise and flexible representation of the locality, availability, and security requirements of application 102 without needing to capture the specifics of the cloud infrastructure underlying network 100. The deployment plan may be based on one or more affinity rules, diversity (or anti-affinity) rules, exclusivity rules, or pipe rules. The deployment plan may further be based on nesting groupings (e.g., rules or sets of VMs 104). For example, the abstraction may provide for certain VMs 104 to be grouped together, so that rules may be applied to groups of VMs 104 or to individual VMs 104. A group may include one or more VMs 104, or other elements 105, such as ingress points, or the like. For example, FIG. 1A shows two example groups 107.

Figure 1C:
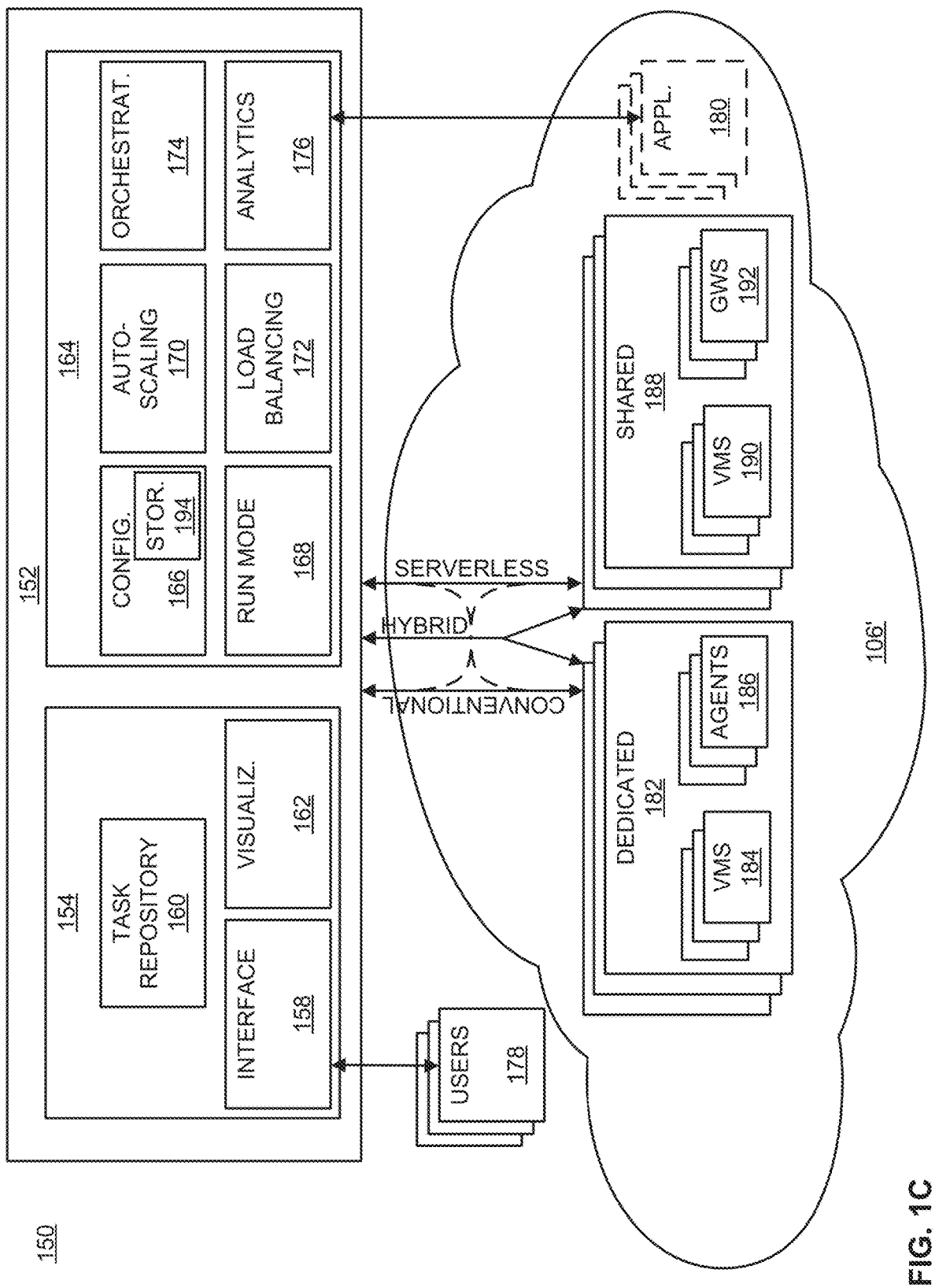
FIG. 1C is a representation of an example arrangement for implementing a cloud computing data processing system.

FIGS. 1A and 1B provide an environment for systems described herein, which can include host systems, guest systems, or orchestration systems. Supported in such an environment, or other cloud environments, FIG. 1C illustrates an example cloud arrangement 150 for implementing automated modification of virtualized functions as supported by environments like those of FIGS. 1A and 1B. Cloud arrangement 150 includes cloud computing data processing system 152. Cloud computing data processing system 152 includes frontend 154 and backend 164. While illustrated as separate components, frontend 154 and backend 164 may be merged as a single component, or subcomponents may be distributed between frontend 154 and backend 164 in arrangements other than that illustrated, without departing from the scope or spirit of the innovation. Further, cloud computing data processing system 152 can be a locally hosted, run in one or more of dedicated solutions 182 and/or shared solutions 188, run in combinations utilizing both local and remote implementations.

Cloud 106' may be implemented on hardware 106 (and, in embodiments, similar hardware which is logically or physically separate from hardware 106). Cloud 106' includes a variety of cloud solutions including one or more dedicated solutions 182 and one or more shared solutions 188. Each of dedicated solutions 182 include a plurality of virtual machines 184 and one or more agents 186 for providing monitoring and control of the virtual machines 184. Agents 186 can be deployed to VMs by, e.g., orchestration component 174, run mode component 168, and/or other components. Shared solutions 188 include a plurality of virtual machines 190 and one or more gateways to provide communication between cloud computing data processing system 152 and virtual machines 190 (and/or shared solutions 188 generally).

Cloud computing data processing system 152 can use a broker to communicate with agents 186. Various uniform resource locators (URLs) can be used to identify endpoints for communications, and backend 164 (or an engine containing some or all thereof) can have a unique identifier or queue to facilitate routing. Agents 186, which are services for integration with cloud computing data processing system 152, run on each virtual machine in dedicated solutions 182, and execute tasks assigned to the virtual machine and provide reporting and metrics to cloud computing data processing system 152 (e.g., via analytics component 176. Proprietary parameters associated with tasks for running said tasks on dedicated solutions 182 can include information for reaching particular agents 186 as well as details required by the respective arrangement of visual machines 184.

For shared solutions 188, in which cloud computing data processing system 152 and/or administrators thereof do not own or manage portions of the cloud solution, gateways 192 are used to submit tasks for handling by the cloud resources of shared solutions 188. Proprietary parameters associated with tasks for running said tasks on shared solutions 188 can include information for reaching particular gateways 192 as well as details required by the respective arrangement of virtual machines 190.

When utilizing cloud computing data processing system 152, users 178 can interact with interface 158 or other portions of the system. Applications 180 are shown interacting with analytics component 176. In various embodiments, users 178 can interact with other elements or portions of cloud computing data processing system 152 and/or cloud 106', and applications 180 can interact with various elements or portions of cloud computing data processing system 152 and/or cloud 106'. More, applications 180 may be hosted by one or both of dedicated solution 182 and shared solution 188 without departing from the scope or spirit of the innovation.

In the illustrated embodiment, frontend 154 includes interface 158, task repository 160, and visualization component 162. Interface 158 is configured to receive task input including the plurality of task parameters. Task input includes information about tasks to be managed by cloud computing data processing system 152, stored in task repository 160 then utilized by backend 164 to run the tasks using one or more cloud services. Task input can be received as manually entered by a user, in a semi-automatic fashion (e.g., user selection based on automatically populated fields), or automatically (e.g., recognize tasks and import without user entry or selection after the task is identified). In embodiments, interface 158 (or other elements) may be configured to encode the task input to a local format prior to storing the plurality of task parameters in the task repository. In embodiments, the interface can be used for user commands before, during, or after tasks are run, and can be configured to receive, e.g., a task instruction. The task instruction may cause transmission of a communication configured to run a task on at least one of the two or more cloud services. Such a communication includes service parameters required by the at least one of the two or more cloud services to run the task. In alternative or complementary embodiments, the user interface may be configured to receive user input overriding at least one of the plurality of task parameters selecting a particular parameter value, running mode, et cetera).

In embodiments utilizing running modes as discussed herein, interface 158 may be a graphical user interface on a display configured to receive a running mode selection, wherein the running mode selection indicates the running mode for allocating the tasks. Running modes for tasks as well as performance metrics of various cloud services, virtual machines, and tasks can also be displayed. Visualization component 162 can work in conjunction with interface 158 to provide visual representations and infographics depicting the activity and performance of cloud computing data processing system 152 as well as the various cloud services and their VMs. In embodiments, graphical user interface 158 can display a dynamic webpage possessing information describing cloud computing data processing system 152 and related cloud solutions.

In alternative or complementary embodiments, interface 158 can include one or more Application Programming Interfaces (APIs) that assist task generation and/or importation.

Interface 158, implemented as a graphical user interface, can include widgets to create, modify, and remove tasks in the repository, as well as display all tasks. Interface 158 can further include a thread drawing canvas to link tasks to create threads or chains of tasks. Interface 158 can also include a thread running control allowing users to control (e.g., start, pause, stop, command, interact with) tasks or chains of tasks. Interface 158 can also include elements for parameter definitions beyond the basic task, such as arguments for functions or aspects supporting environment-specific setup. In embodiments, interface 158 also facilitates defining custom metrics for collection by analytics component 176.

Task repository 160 is configured to store a plurality of task parameters after being received from interface 158. Task repository 160 may be pre-arranged to contain task parameters for one or more tasks without the use of interface 158. The plurality of task parameters are stored in fields associated with task entries in task repository 160. Fields can be automatically populated with default values, or users can be prompted for input, where task input does not satisfy all fields.

Task parameters can be classified as common parameters and proprietary parameters. Common parameters are those used by multiple or all cloud services to receive and handle tasks, or those which are used by at least one cloud service and the cloud computing data processing system 152. Proprietary parameters are those which are service-specific (e.g., particular information required for Amazon Web Services to receive a task request which is not required by CenturyLink Cloud) and not used outside of a particular cloud implementation. In embodiments, task repository 160 can store only common parameters, and cloud computing data processing system 152 can encode, format, derive, transform, et cetera, the common parameters to satisfy the requirements to provide the tasks to any cloud service.

Task repository 160 (or other elements of cloud computing data processing system 152) may be configured to link task entries to create linked tasks or threads of tasks for simultaneous, series, or other execution.

Task repository 160, or other storage, may also store information relating to one or more of dedicated solutions 182 and/or shared solutions 188. Such information can include details not directly related to tasks that still enable cloud computing data processing system 152 to interact with and manage dedicated solutions 182 and shared solutions 188 (for, e.g., load balancing, auto-scaling, collection of metrics, deconflicting running modes). More, task repository 160 or other storage may maintain parameters specific to cloud computing data processing system 152.

In the illustrated embodiment, backend 164 includes configuration component 166, run mode component 168, auto-scaling component 170, load balancing component 172, orchestration component 174, and analytics component 176. In embodiments, the subcomponents of backend 164 (with or without subcomponents of frontend 154) can be consolidated into an engine. More, even where functional components are defined in distinct modules, it is understood that several may be codependent or interact in a unified fashion (e.g., load balancing component 172 and auto-scaling component 170, configuration component 166 and orchestration component 174).

Configuration component 166 can be used to configure task requests and other interaction between cloud computing data processing system 152 and the cloud services it leverages or manages including dedicated solutions 182 and shared solutions 188. Each solution may define its own techniques for communications or require particular information, or particularly formatted information, for use. Configuration component 166 ensures that information sent to each solution accords with its requirements, and that traffic from solutions to cloud computing data processing system 152 is understood. In embodiments, configuration component 166 can be used for encoding, transformation, translation, et cetera, of task information or other information to standardize such information in accordance with the arrangement of task repository 160 or other components of cloud computing data processing system 152.

In embodiments, configuration component 166 receives or builds (e.g., collects information and/or encodes) JSON files containing data describing how resources (including VMs 184 in dedicated solutions 182) are created and/or tasks assigned. These JSON files can be task entries and/or other cloud solution information, and can be stored in task repository 160. User customizations can also be included. JSON files can include, e.g., a class configuration including a connection classname (which identifies the broker), a tasking classname (which includes rules for task allocation and certain aspects of load balancing and auto-scaling), a resource classname (which includes rules for orchestration for starting, stopping, and configuring VMs), a storage classname (which includes rules and locations for storage); a logging configuration including a logging configuration file (determines a verbosity level for different components of cloud computing data processing system 152; can be a log4j file), logs directory (log storage location(s)), resource time check (time in seconds to monitor resource loading), and do not terminate list (VMs which should not be terminated regardless of resource load); a VM configuration file (e.g., select and open file controls for providing and editing JSON files; VMs can read changes without restarting); and a broker configuration including a broker's URL and engine identifier (e.g., identifying backend 164). Addresses can be provided for brokers, configuration information, and other aspects to assist with locating different assets or components of cloud computing data processing system 152 or cloud services with which it interacts.

Configuration component 166 can also include system storage 194. System storage 194 can store various information or data for further configuration. In an embodiment, system storage 194 can store an image database configured to store a virtual machine image in a stored image format. The image database can alternatively exist in its own storage separate from configuration component 166, or elsewhere in frontend 154, backend 164, cloud 106', et cetera. Configuration component 166 or other components of backend 164 can be configured to convert the virtual machine image from the stored image format (e.g., standard image format employed by the image database) to a deployed image format that conforms to formatting for one of the two or more disparate cloud services (e.g., different formats or related data used by AEM, Google, or proprietary dedicated solution, et cetera). Configuration component 166, orchestration component 174, or other components can thereafter deploy the virtual machine image in the deployed image format to a virtual machine instance of the one of the two or more disparate cloud services. In embodiments, the stored image format may correspond to a format used by one or more cloud services, and can accordingly be deployed without conversion. For dedicated solutions, agents can be utilized to receive VM images or instruct instantiation of VMs according to images, and for shared solutions images or instructions to instantiate images can be provided to gateways associated with a given shared solution. In embodiments, interface 158, configuration component 166, and/or other components of cloud computing data processing system 152 can receive a virtual machine image, or generate an image of an instantiated virtual machine, and store the virtual machine image in an image database. In embodiments, cloud computing data processing system 152 or portions thereof can direct an agent among agents 186 to image (e.g., provide and copy relevant information to create an image or representation of an image) a virtual machine instance for storage. In embodiments a received image can be converted from a native image format to the stored image format before storing in the image database.

Orchestration component 174 provides instructions (e.g., to dedicated solutions 182) or requests (e.g., to shared solutions 188) based on determinations made by cloud computing data processing system 152 or received from users 178. Orchestration component 174 can interact with agents 186 or instantiate new VMs 184 including agents 186. Orchestration component 174 can also interact with gateways 192 to provide requests to shared solution 188.

In embodiments, configuration component 166 and orchestration component 174 can be used to assign tasks to one or more VMs 184 of the dedicated solutions 182 and/or one or more shared solutions 188. Where assignment is to one or more dedicated solutions 182, dedicated parameters, matching those required for task assignment to each dedicated solution, can be sourced from task repository 160 and appropriately encoded (e.g., to a dedicated format for a given dedicated solution) for handling by one or more of agents 186. Similarly, where assignment is to one or more shared solutions 188, shared parameters, matching those required for task assignment to each shared solution, can be sourced from task repository 160 and appropriately encoded (e.g., to a shared format for a given shared solution) for receipt by one or more of gateways 192. Orchestrator 174 or another component can provide these parameters, as separate parameters or as a consolidated instruction request. As discussed herein, the target for task allocation may vary based on load balancing, auto scaling, or other techniques.

Run mode component 168 allows management of task allocation between dedicated solutions 182 and shared solutions 188. Tasks can be allocated according to a running mode implemented by run mode component 168. Running modes include a dedicated mode configured to direct the tasks to one or more dedicated solutions 182, a serverless mode configured to direct the tasks to one or more shared solutions 188, and a hybrid mode configured to direct the tasks to a combination of the dedicated solutions 182 and the shared solutions 188. Based on the selected running mode, orchestrator component 174 can direct one or more agents 186 associated with one or more virtual machines 184 of the dedicated solutions 182 to execute the tasks if the tasks are allocated according to the dedicated mode or the hybrid mode, or provide task parameters to one or more gateways 192. associated with the shared solutions 188 if the tasks are allocated according to the serverless mode or the hybrid mode. Default running mode(s) can exist which can be override-able by user input or contextual analysis. Running modes can utilize disparate services, assigning tasks indicated for serverless or hybrid handling to multiple disparate services among shared solutions 188, and/or assigning tasks indicated for dedicated or hybrid handling to multiple disparate dedicated solutions 182.

In embodiments, running mode can be selected by a user interacting with interface 158. In embodiments, running modes can be selected by cloud computing data processing system 152. Where selected by system 152, analytics component 176 can determine costs associated with the tasks based on the dedicated mode, the serverless mode, and the hybrid mode. Dedicated solutions 182 may have certain fixed costs associated with fixed resources, while shared solutions 188 may include greater scalability but costs which increase with resource utilization or prioritization. Accordingly, running modes can be selected to meet cost goals (e.g., cost caps, optimization, cost spreading between vendors, minimum purchase amounts). Similarly, analytics component 176 can be configured to determine (or project) performance or resource consumption associated with the tasks based on the dedicated mode, the serverless mode, and the hybrid mode. Based on necessary service levels, resource caps, urgency, et cetera, running mode can be selected based on performance or resource consumption.

In embodiments, orchestration component 174 can be configured to start or stop (e.g., instantiate or terminate, allocate or deallocate) one or more of VMs 184 based on the dedicated mode or the hybrid mode.

Selection of the running mode, and more general allocation performed by orchestration component 174, can also be driven by constraints associated with particular solutions. For example, certain cloud services include a timeout period after which a task is terminated whether or not the task was completed. Accordingly, based on task parameters or other information, a running mode can be selected, or more general task allocation made, to avoid assigning tasks which may exceed certain services' timeouts to those services. Other solution constraints, particularly in shared solutions 188, can be built into rules associated with run mode component 168, auto-scaling component 170, load balancing component 172, et cetera.

Auto-scaling component 170, in conjunction with load balancing component 172, creates efficiency between performance and economy by making resources available for tasks based on overall task demand. Auto-scaling component is configured to provide a scale-up instruction when resource utilization of the tasks, based on performance metrics (as developed from, e.g., analytics component 176), is above a first utilization threshold. The first utilization threshold can be a percentage utilization for one or more resources, an absolute amount of resources, a dynamic threshold based on demand projections whether an identified task or standard deviation from existing demand can be supported), expected termination times for currently running tasks, et cetera, and can be based on context (e.g., based on the number of VMs available, number of tasks running, historical demand; Where historical demand is analyzed cloud computing data processing system 152 can utilize pattern recognition, artificial intelligence, or machine learning to develop models or projections). Auto-scaling component is also configured to provide a scale-down instruction when resource utilization of the tasks, based on the performance metrics, is below a second utilization threshold and a deconfliction check is completed. Once again, the threshold may be static or dynamic and depends on whether resources can be de-allocated without impacting running or anticipated tasks.

A deconfliction check is conducted to avoid scaling down one of VMs 184 or releasing resources from shared solutions 188 prior to task completion on a respective platform. In embodiments, orchestration component 174 can avoid further task assignment where one of VMs 184 and/or resources of shared solutions 188 are indicated for scaling down. Because embodiments of auto-scaling component 170 may look at overall resource utilization to determine scaling-up or scaling-down instructions, a lower-level inspection of resources to be released can be conducted to ensure no disruption occurs prior to their release.

Auto-scaling component 170 can provide consistent auto-scaling regardless of cloud solution utilized. Configuration elements for auto-scaling can be ported (e.g., by configuration component 166) between solutions. Such configuration elements can include custom metrics, roles (e.g., permissions for making cloud service requests), launch configuration (e.g., imaging for scaled-up VMs or resources), auto-scaling group definitions, auto-scaling alarms, and auto-scaling policies.

Based on the instructions, orchestration component 174 is configured to, in response to the scale-up instruction, command the dedicated solution to instantiate a new virtual machine to receive at least a portion of the tasks, or provide a scale-up message (or another message to request additional resources; such messages may be proprietary to one or more of shared solutions 188) to one or more shared solutions 188 in preparation for handling at least a portion of the tasks. Orchestration component 174 is also configured to, in response to the scale-down instruction, command the dedicated solution to terminate an existing virtual machine, or provide a scale-down message (or another message to release resources; such messages may be proprietary to one or more of shared solutions 188) to the shared solution.

Scale-up or scale-down instructions can further be based on a number of free agents. In embodiments, cloud computing data processing system 152 can maintain a number of free agents (e.g., minimum or maximum) as an absolute number, resource amount, or based on context such as current or projected traffic or the standard deviation of demand e.g., more free agents for times or sessions during which demand fluctuates more significantly). Free agents are specific agents among agents 186 associated with VMs 184 that are not presently assigned to any session. These free-agents can be used to satisfy the need, based on a current, requested, or projected session, for a new virtual machine. Free agents allow cloud computing data processing system 152 to have one or more VMs available at any time to provide responsive flexibility to increased demand. When a free agent is utilized (e.g., when demand increases), a scale-up message can be provided to satisfy, e.g., a minimum number of free agents running. However, excess free agents, which useful for minimizing latency, can increase costs; accordingly, a number of free agents can be used in scale-up or scale-down decisions to proactively maintain flexibility and responsiveness without unnecessarily increasing cost.

Scaling can include rules for observing various constraints or seeking to drive performance or other variables to particular levels. In an embodiment, cost approach rules can be used in conjunction with auto-scaling component 170. For example, performance metrics can include a dedicated solution virtual machine cost associated with one of dedication solutions 182 and a shared solution virtual machine cost (or shared solution resource cost) associated with one of shared solutions 188. Such costs can be dynamic or vary by task or context. In embodiments, a scale-up instruction commands the dedicated solution to instantiate a new virtual machine when the dedicated solution virtual machine cost is less than the shared solution virtual machine cost or provides the scale-up message (which can be proprietary to the particular shared solution) to the shared solution when the shared solution virtual machine cost is less than the dedicated solution virtual machine cost. Similarly, a scale-down instruction commands the dedicated solution to terminate the existing virtual machine when the dedicated solution virtual machine cost is greater than the shared solution virtual machine cost or provides the scale-down message (which can be proprietary to the particular shared solution) when the shared solution virtual machine cost is greater than the dedicated solution virtual machine cost.

Auto-scaling component 170 and related rules significantly ease the burden of establishing auto-scaling in cloud environments. For example, a single implementation of auto-scaling in a given cloud environment can involve significant manual programming requiring creation of custom metrics, creation of roles, creation of launch configuration, creation or identification of auto-scaling groups, creation of scaling alarms to scale up or down, adding scaling polices to scale up or down, et cetera. Auto-scaling component utilizes a resource view of cloud 106' across multiple cloud services to manage assigned resources or free agents in those multiple cloud services based on task parameters and information relating to dedicated solution 182 and shared solutions 188.

Load balancing component 172, based on resources available, determines where to assign tasks among dedicated solutions 182 and shared solutions 188. Load balancing component 172 is configured to receive performance metrics from a plurality of virtual machines which can be associated with disparate cloud services. Load balancing component 172 is further configured to select one or more target virtual machines among VMs 184 and/or VMs 190 (or gateways 192, or more generally shared solutions 188, where particular VMs 190 cannot be selected) to run tasks based on the performance metrics (as discerned by, e.g., analytics component 176), a multiservice load balancing scheme, and task parameters.

Load balancing schemes can be based on a variety of rules. In an embodiment, a load balancing scheme can be based on CPU settings associated with e tasks. CPU settings can be task parameters, historical values, or user-provided values. In various embodiments, a first CPU setting provides that the target virtual machine employs a custom task allocation algorithm; a second CPU setting provides that the target virtual machine has CPU availability greater than or equal to the second CPU setting; and/or a third CPU setting provides that the target virtual machine is dedicated to the one of the tasks having the third CPU setting, and wherein the target virtual machine remains dedicated until the one of the tasks is complete. In one or more of the foregoing embodiments, the first CPU setting can be a minimum CPU setting (e.g., 0%), a second CPU setting can be a value greater than zero but less than a maximum CPU setting (e.g., 1% to 99%), and a third setting can be a maximum CPU setting (e.g., 100%).

In embodiments, a task allocation algorithm of the load balancing scheme (e.g., a custom load balancing algorithm) may include a class. The class includes a routine, and the routine includes aspects to define a configuration set, receive task objects associated with the tasks and a list of including the plurality of virtual machines to assign the tasks, allocate resources, and deallocate resources. In this manner, load balancing and auto-scaling work complementarily. In embodiments, a default task allocation algorithm can assign a task to a virtual machine having the lowest number of tasks.

As described above, analytics component 176 is configured to monitor performance metrics of the two or more cloud services including the dedicated solution and the shared solution. This is useful as existing cloud solutions do not provide performance metrics in a uniform manner, and may require complicated development efforts to create services for observing and reporting performance metrics. Cloud computing data processing system 152 automates this process for dedicated solutions 182 and shared solutions 188. Analytics component 176 can retrieve performance metrics from shared solutions 188 using a routine proprietary to the shared solution and can retrieve performance metrics from agents 186 associated with VMs 184 of dedicated solutions 182.

In embodiments, analytics component 176 can use recent performance, stored historical performance, or processing requests to discern projected performance. The performance metrics and associated resource utilization can be forward-looking, incorporating the projected performance in task allocation decisions, load balancing, auto-scaling, et cetera. Load balancing can alternatively or complementarily be performed based on VM resource loading, first fit, number of tasks, et cetera. In embodiments, task parameters can include a load balancing scheme to be used, or applications can select their own load balancing schemes. Custom load balancing schemes can be defined by users or indicated by applications or particular use cases (which are utilized when, e.g., when the CPU setting is set to zero).

Custom load balancing schemes can take a variety of forms. Examples can include a limit on one or both of a number of tasks handled by a VM or a CPU load threshold (e.g., allow up to 5 tasks or 75% CPU utilization but never above either); a limit on a number of virtual machines (e.g., 5 VMs per session); running related tasks on the same VM to expedite processing (e.g., where similar information used in memory); and others.

Analytics component 176 can provide data to visualization component 162 to provide visual feedback related to performance, utilization, task status and running times, et cetera. Such data can be arranged at various levels of granularity: enterprise level including all resources of cloud 106', solution-level looking at one or more of dedicated solutions 182 and/or shared solutions 188, VM-level or resource-level, task or application level, user level, et cetera. Visualization can include a system view describing tasks in terms of associated VMs, associated tasks, average and/or realtime CPU or memory utilization session views describing instances, numbering and completed, numbers failed, as well as resource utilization; and/or an instance view describing tasks, their states, start and finish times, and resource utilization. These can be provided in graphs or charts, which can be color coded to represent different values (e.g., different resources).

Backend 164 can maintain a task queue for tasks not yet in execution. Tasks run can include any number of tasks, including specialized docker containers or particular VM images. In embodiments, task repository 160 or other storage can include an image database maintaining images for various VMs to be instantiated as standalone tasks or to support running of particular tasks.

Cloud arrangement 150 is provided as an example of an architecture for utilizing and unifying multiple disparate cloud services. As noted above, while certain components are elements are illustrated in a particular manner to assist with explanation of their operation, it is understood that alternative arrangements can be utilized to achieve similar processing, communication, and management without departing from the scope or spirit of the innovation.

As can be understood, cloud computing data processing system 152 provides a level of construction which can interact with a variety of disparate cloud systems using a common scheme, providing the same results on different cloud systems without the need for multiple disparate control mechanisms and technical proficiencies. Implementation patterns or scripts can be used to perform actions (e.g., instantiate a VM according to an image) in disparate systems (e.g., AEM and/or Google) without any different action by a human or computerized user, client, administrator, service, et cetera. Cloud computing data processing system 152 includes a variety of default configurations to work without customization or intensive programming, but includes the capability for customization where sophisticated users, clients, administrators, services, et cetera, wish to modify operation for their particular uses.

Figure 2A:
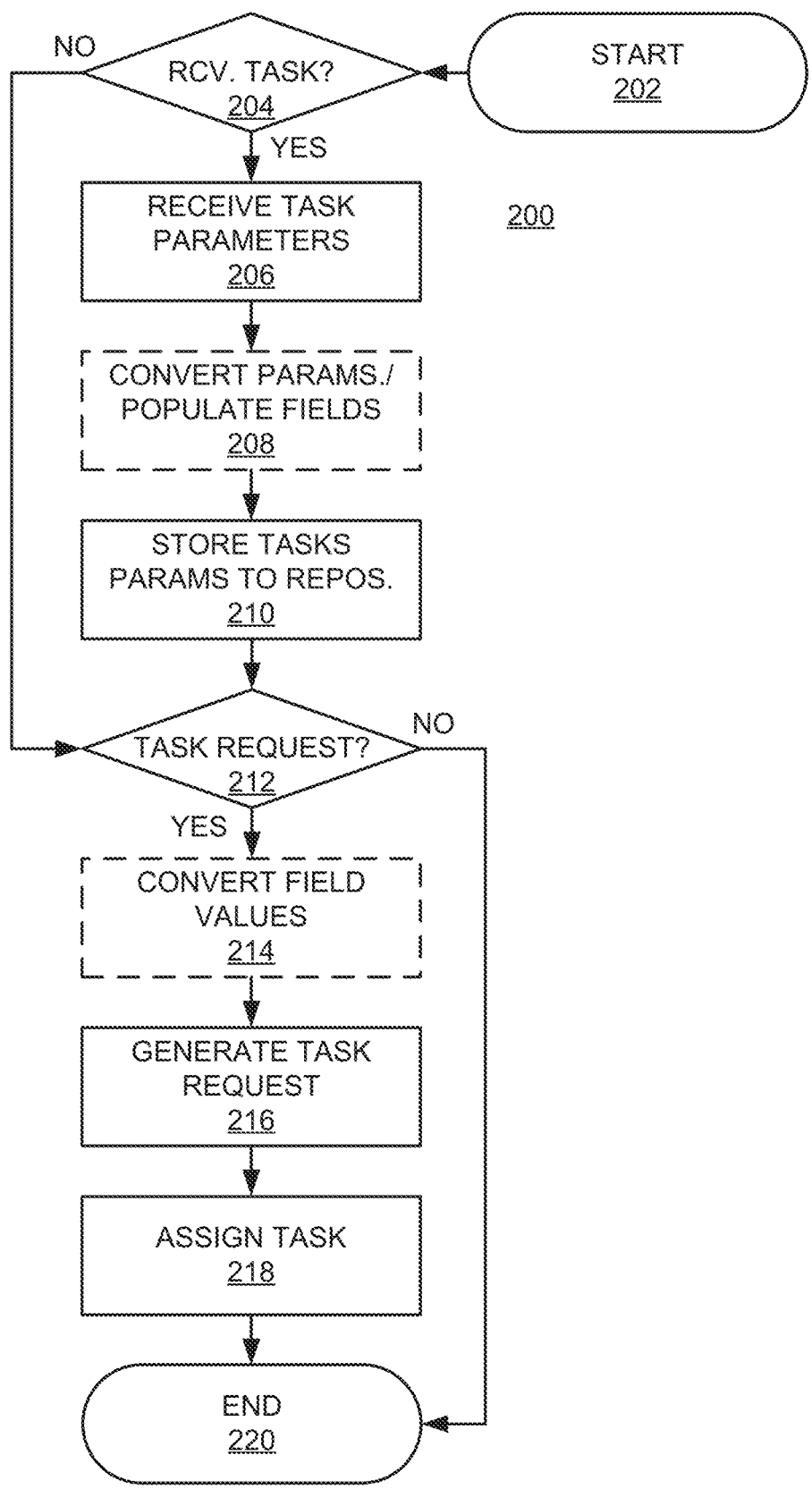
FIG. 2A is a method that may be used to implement a cloud computing data processing system.
Figure 2B:
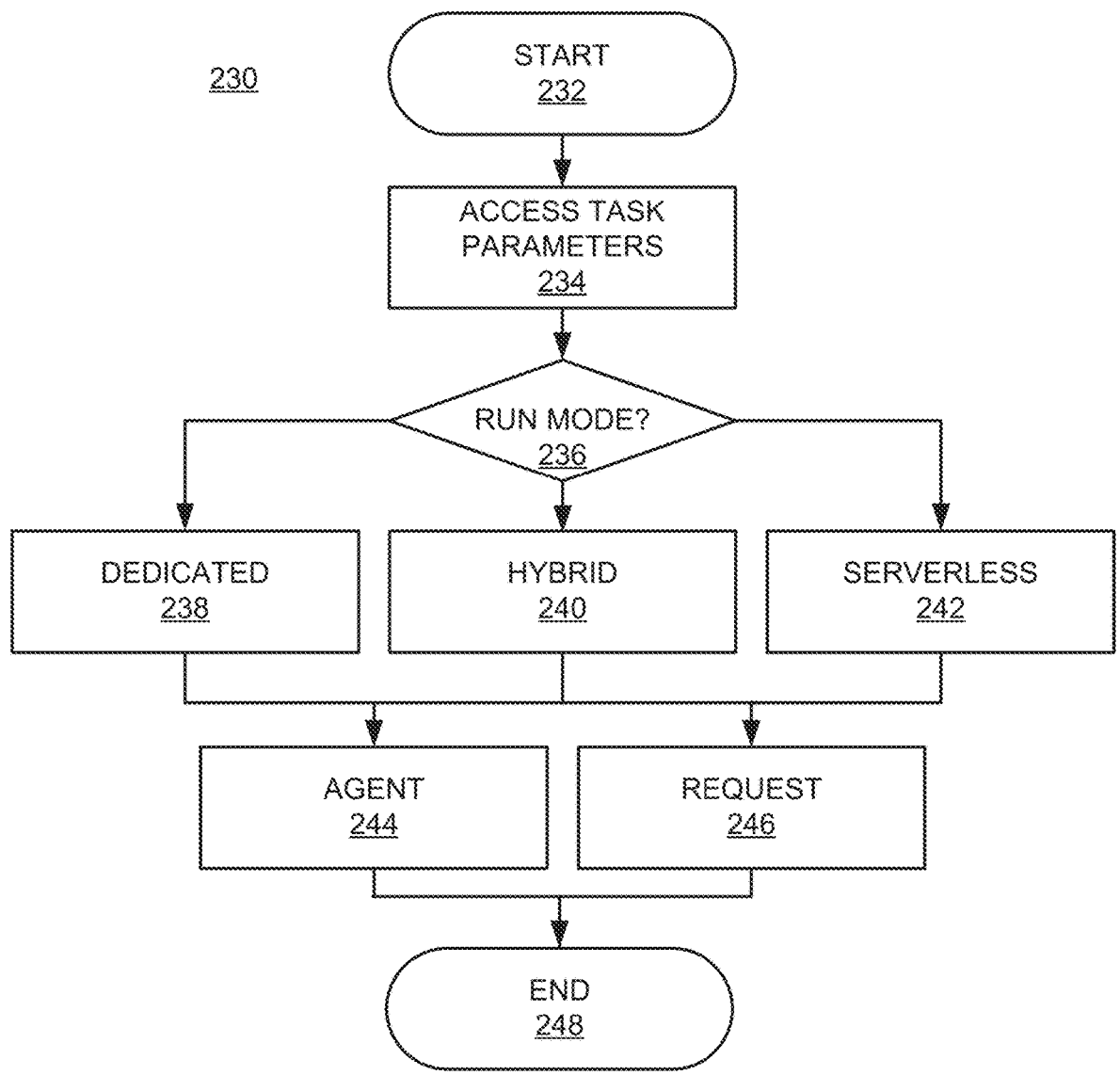
FIG. 2B is a method that may be used to manage task running modes in a cloud computing data processing system.
Figure 2C:
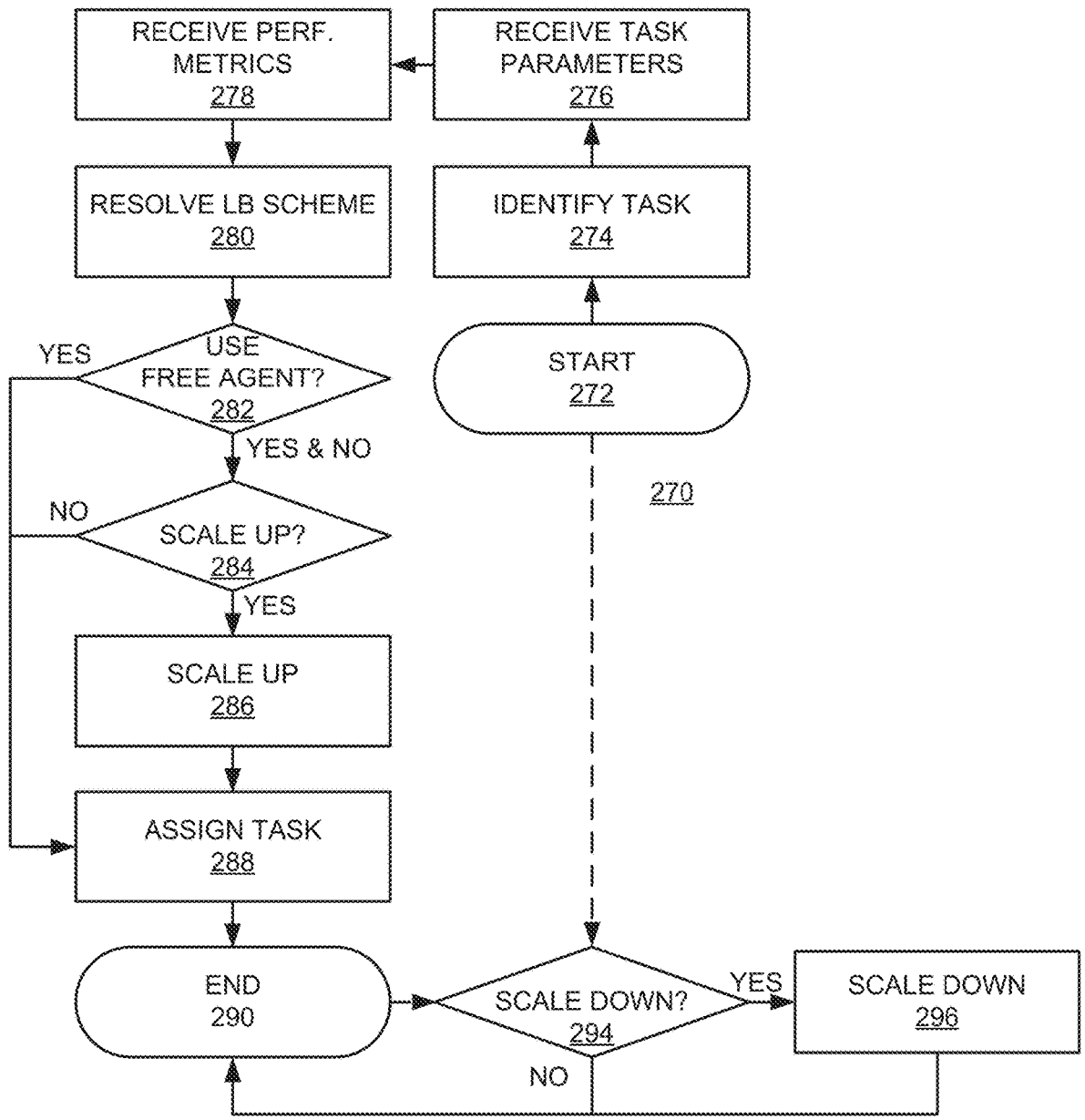
FIG. 2C is a method that may be used to perform load balancing and auto-scaling in a cloud computing data processing system.

Continuing, FIGS. 2A, 2B, and 2C respectively illustrate methodologies 200, 230, and 270 for implementing techniques disclosed herein using cloud computing data processing system 152 or similar systems.

Beginning at FIG. 2A, methodology 200 illustrates example techniques for configuring a cloud computing data processing system for single-point, interoperable management of multiple cloud services. Methodology 200 begins at 202 and proceeds to 204 where a determination to whether a task is being taken into a task repository. If the determination at 202 returns negative, methodology 200 can proceed to 212 where a determination is made as to whether a request to assign a task to cloud resources is being made.

If the determination at 202 returns positive, task parameters can be received at 206. This can involve, e.g., receiving, via an interface, task input including a plurality of task parameters. The task parameters can be arranged and provided (e.g., at 214-218) to cause one or more tasks to run on cloud services.

In some embodiments, at 208 the received parameters can be encoded or converted (e.g., to a local format used by a cloud computing data processing system, to a standard used by one or more cloud services) prior to populating the fields of a task repository. At 210, the task parameters (or transformed values thereof) can be stored in the task repository for use with cloud services.

At 212, a determination is made as to whether a task assignment is pending (e.g., a task is manually or automatically selected to run on cloud resources). If the determination at 212 returns in the negative, methodology 200 can proceed to end at 220, or may recycle to, e.g., 202 to continue awaiting tasking. If the determination at 212 returns positive, an entry in the task repository associated with a task to run is accessed to retrieve parameters required for one or more cloud services (which can be among a plurality of disparate cloud services) to run the task.

In embodiments at 214, field values can be converted or encoded to match a target service requirement. For example, common parameters can be converted to dedicated parameters for a particular dedicated solution or shared parameters for a particular shared solution. In embodiments, such encoding or converting can be performed during or after task request generation.

At 216, a task request is generated. The task request can include all parameters necessary to assign the task to one or more cloud solutions. In embodiments, the task request can include parameters for assigning the task, or a group of tasks, to two or more disparate cloud solutions.

After the task request is generated, at 218, the task can be assigned by providing the task request to a cloud solution. The task request can be routed based on various load-balancing schemes, variable solving techniques, or observation of constraints related to one or more cloud solutions timeout lengths). If the task is to be provided to a dedicated solution, the parameters (e.g., the dedicated parameters) or a consolidated instruction containing the parameters can be provided to an agent of a VM being run by a dedicated solution, if the task is to be provided to a shared solution, the parameters (e.g., the shared parameters) or a consolidated request containing the parameters can be provided to a gateway for the shared solution. Thereafter, at 220, methodology 200 can end.

Continuing to FIG. 2B, methodology 230 illustrates example techniques for managing task running modes in conjunction with a cloud computing data processing system. Methodology 230 starts at 232 and proceeds to 234 where parameters associated with a task for which a running mode is being determined are accessed. The task parameters may provide a default running mode, automated or manual task execution can define a running mode, or cloud or system context can be used to select a running mode. A graphical user interface can be used to provide such input, and can include a running mode selection option associated with one or more tasks.

At 236, based on the parameters or input, a running mode is determined. Running modes include dedicated, serverless, and hybrid. A dedicated running mode includes cloud resources for which a cloud computing data processing system or its users possess a higher level of administrative control, while a serverless running mode submits tasks to a third-party managed cloud solution for execution. The hybrid mode assigns one or more tasks to both. In embodiments, the determination at 236 can be based on costs or performance. Further, the determination as to whether to assign some or all of one or more tasks to a serverless mode can depend on whether the task(s) may exceed a timeout or otherwise fail a constraint of one of the shared solutions.

If the determination at 236 determines that a dedicated mode is being used, methodology 200 proceeds to 238 where a broker of a cloud computing data processing system contacts agents of virtual machines in one or more dedicated solutions to assign the tasks at 244.

If the determination at 236 determines that a serverless mode is being used, methodology 200 proceeds to 240 where a cloud computing data processing system sends one or more transmissions bearing task parameters to one or more gateways associated with one or more shared solutions to request handling of the tasks by the shared solutions at 246.

If the determination at 236 determines that a hybrid mode is being used, methodology 200 proceeds to 240 where both agents and gateways are contacted to allocate the task(s) among the dedicated and shared solutions at 244 and 246. If a hybrid mode is being used, a "reply to" field can be provided as a task parameter to allow status information to be passed back to a common receiver regardless of cloud solution.

In embodiments, a virtual machine of a dedicated solution can be started or stopped, or resources of a shared solution can be requested or released, to scale based on the needs of a determined running mode.

Regardless of the mode selected, one or more tasks can be allocated, in whole or part, to a single solution or two or more similar or disparate solutions. Thereafter, with tasks allocated, methodology 230 ends at 248.

Continuing to FIG. 2C, methodology 270 illustrates example techniques for managing scaling and load-balancing in conjunction with a cloud computing data processing system. Methodology 270 begins at 272 and proceeds to 274 where a task is identified for assignment and parameters accessed. Thereafter, at 278, performance metrics are accessed to assess resource availability and where resources are available.

Thereafter or simultaneously, at 282, a determination is made as to whether the load balancing assignment requires use of a free agent (e.g., VM not currently involved in a session). If so, a free agent is located and methodology 270 proceeds to 288 where the task is assigned to the free agent.

Regardless of whether a free agent receives the task, methodology 270 proceeds to 284 where a determination is made as to whether a particular cloud solution should scale up or allocate additional resources. This is because, if no free agent is used, additional resources still might be required, and if a free agent is used, another free agent may need to be created to observe a minimum free agent count in a cloud computing data processing system. (In an alternative embodiment, the task identified can be completing or terminating, and an auto-scaling determination can relate to scaling down a VM or releasing resources.) A scale-up instruction can be based on resource utilization or other metrics in conjunction with service levels, task urgency, and various scaling thresholds. The values analyzed prior to issuing the instruction can be current or realtime, historical, or projected.

If the determination at 284 returns negative, no scaling is required, and the task is assigned to an existing virtual machine if not yet assigned. If the determination at 284 returns positive, methodology 270 proceeds to 286 where additional resources are allocated. Thereafter, if the task is not yet assigned, it can be assigned at 288 to the newly-allocated resources made available through auto-scaling. Thereafter, at 290, methodology 270 can end.

In alternative or complementary embodiments, a scale-down determination or instruction cap be performed in parallel or as a separate routine. A determination as to whether to scale down resources, based on performance metrics or other information, can be made at 294. If the determination returns negative, methodology 270 ends at 290. If the determination at 294 returns positive, methodology 270 proceeds to 296 where resources are scaled down. In embodiments, a deconfliction check can be completed prior to scaling down to ensure tasks are complete prior to terminating a VM or releasing resources. Further, a free agent check can be conducted to ensure scaling down does not reduce free agents below a target number. A scale-down instruction can be based on resource utilization or other metrics in conjunction with service levels, task urgency, and various scaling thresholds. The values analyzed prior to issuing the instruction can be current or realtime, historical, or projected. Thereafter, methodology 270 ends at 290.

In alternative or complementary embodiments of FIG. 2C, load balancing and scaling can be performed in the absence of a new task. For example, tasks can be dynamically reallocated on the fly to continuously load balance. In another example, auto-scaling can occur based on the completion of tasks rather than the assignment of tasks. Other variants to methodology 270, as well as methodologies 200 and 230, will be apparent on review of this disclosure.

Figure 2D:
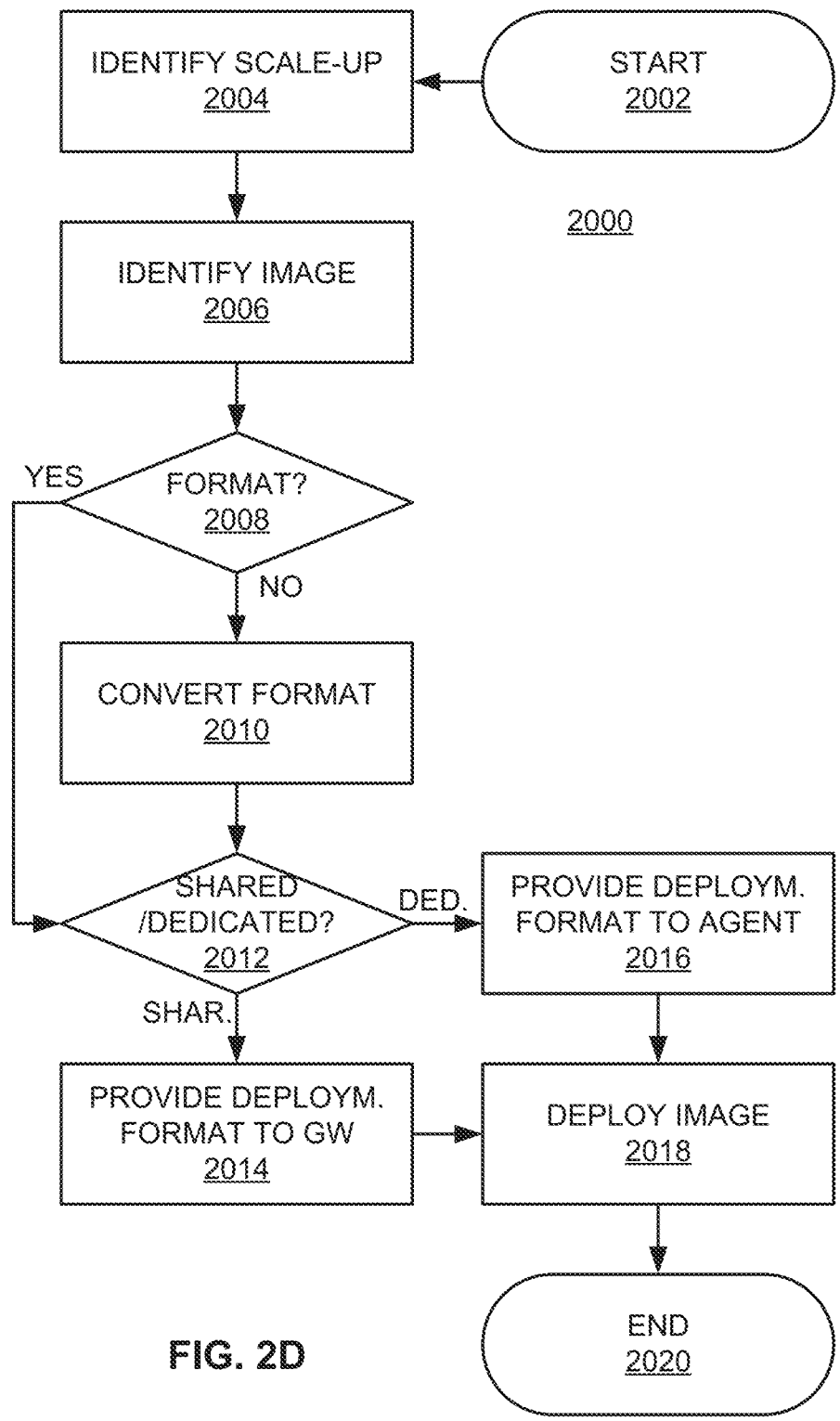
FIG. 2D is a method that may be used to perform virtual machine image importing in disparate cloud solutions.

FIG. 2D illustrates an example methodology 2000 for deploying a virtual machine image to create an instance of the virtual machine image on one or more of a disparate plurality of cloud solutions. Methodology 2000 begins at 2002 and proceeds to 2004 where a scale-up instruction can be identified. The scale-up instruction can specify particular parameters (e.g., resources requested, tasks to be handled, user, service level) for a virtual machine being instantiated in response to the scale-up instruction. Based on various load balancing or auto-scaling rules, the scale-up request can be designated to one or more cloud solutions, which may be shared or dedicated solutions. The designated solution will dictate a particular format (e.g., the deployed format) of image to be provided to accordingly instantiate a VM, as each solution may require a particular or proprietary image format to properly instantiate a particular virtual machine image.

At 2006, a virtual machine image satisfying the scale-up instruction can be identified. In embodiments, the virtual machine image is stored in an image database. The image database can store images in native formats or in a stored image format, which can standardize the images according to a common format. In embodiments, 2004 and 2006 may be a single step, or may change partially in order, such that an image is identified before a target cloud solution to instantiate the image is identified.

Based on the target solution(s) and identified virtual machine image, at 2008, a determination is made as to whether the virtual machine image available matches a format which can be instantiated on the target solution(s). If the determination at 2008 returns negative, methodology 2000 proceeds to 2010 where stored image is converted from the stored image format to a deployed image format suitable for deploying to the target solution(s). Thereafter, or if the determination at 2008 returns positive, methodology 2000 advances to 2012.

At 2012, a determination is made as to whether the target solution(s) are dedicated solutions or shared solutions. This determination is not mutually exclusive, and in embodiments, both paths can be utilized simultaneously or sequentially for a single virtual machine image. If the determination at 2012 indicates that a dedicated solution is a target for instantiating the virtual machine image, the virtual image in the deployment format, or parameters related thereto, are provided to an agent of the dedicated solution at 2016. If the determination at 2012 indicates that a shared solution is a target for instantiating the virtual machine image, the virtual image in the deployment format, or other parameters related thereto, is provided to a gateway associated with the shared solution at 2014.

At 2018, the image is deployed, and a new virtual machine is instantiated (or an existing virtual machine is modified) to deploy the image. Thereafter, at 2020, methodology 2000 ends.

In alternative or complementary embodiments, a stored image format can conform to image formatting used by a target solution, and can be deployed directly to the target solution without conversion. In alternative or complementary embodiments, methodology 2000 or similar methodologies can include an image import aspect whereby a virtual machine image is generated or received and stored in an image database. In further embodiments a generated or received virtual machine image can be converted from a native format to a stored format for storage in the stored format (e.g., independently or in conjunction with the native format virtual machine image). In embodiments, an agent can be directed to image (e.g., provide and copy relevant information to create an image or representation of an image) a virtual machine instance for storage. In alternative or complementary embodiments, multiple virtual machine images can be deployed to one or more cloud solutions in one or more formats.

Figure 3:
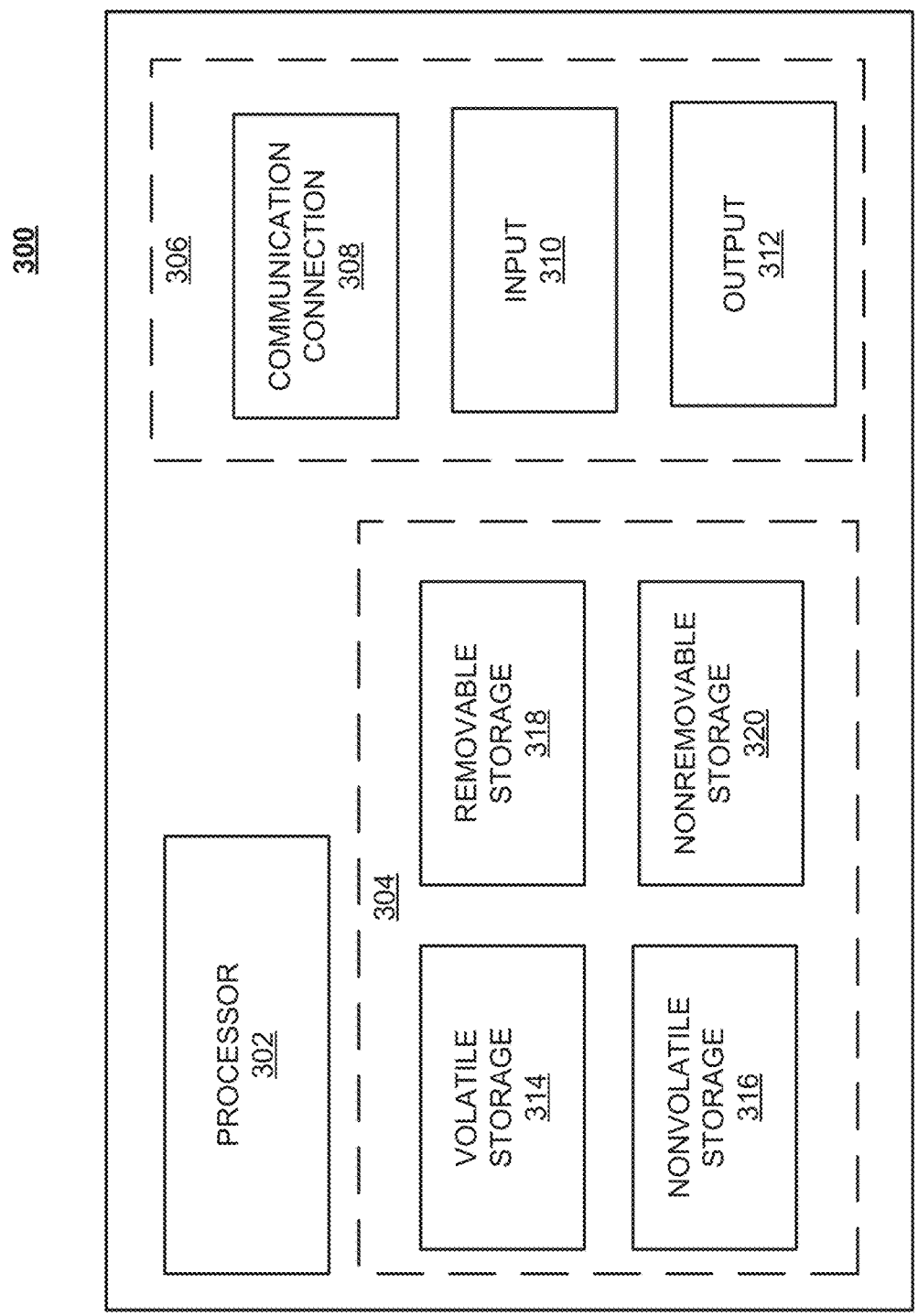
FIG. 3 is a schematic of an example device that may be used to manage scaling and load balancing in a cloud computing data processing system.

FIG. 3 is a block diagram of network device 300 that may be connected to or comprise a component of network 100. For example, network device 300 may implement one or more portions of method 200 for placement of network components of application 102. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a network, a processor, a server, a gateway, a node, or the like, or any appropriate combination thereof. It is emphasized that the block diagram depicted in FIG. 3 is example and not intended to imply a limitation to a specific implementation or configuration. Thus, network device 300 may be implemented in a single device or multiple devices (e.g., single server or multiple servers, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with managing cloud services. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications there between. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or ether data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for managing cloud services, as described herein. For example, processor 302 may be capable of, in conjunction with any other portion of network device 300, managing multiple disparate cloud services by assigning tasks, managing running modes, conducting scaling and balancing, et cetera, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to manage multiple cloud services.

Figure 4A:
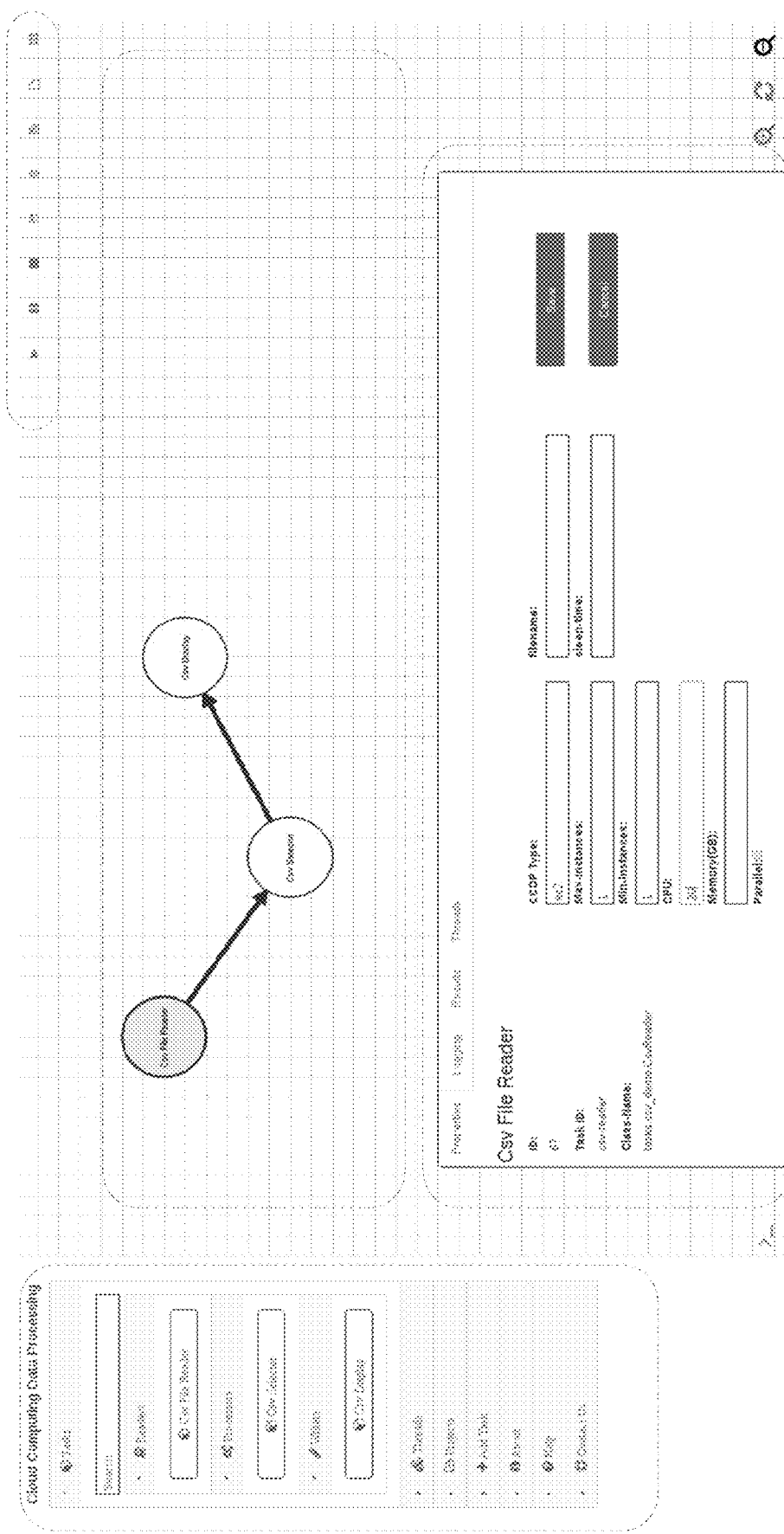
FIG. 4A is an example graphical user interface disclosed herein.

FIG. 4A illustrates a graphical user interface assisting with task arrangement for a cloud computing data processing system. A menu (left) generally shows task definition controls; a thread drawing canvas (gridded area) allows the drawing of threads linking tasks or creating processing threads; a thread running control (upper right) allows threads to be started, stopped, et cetera; and a task properties definition control (bottom center) allows for task properties to be defined for the thread.

Figure 4B:
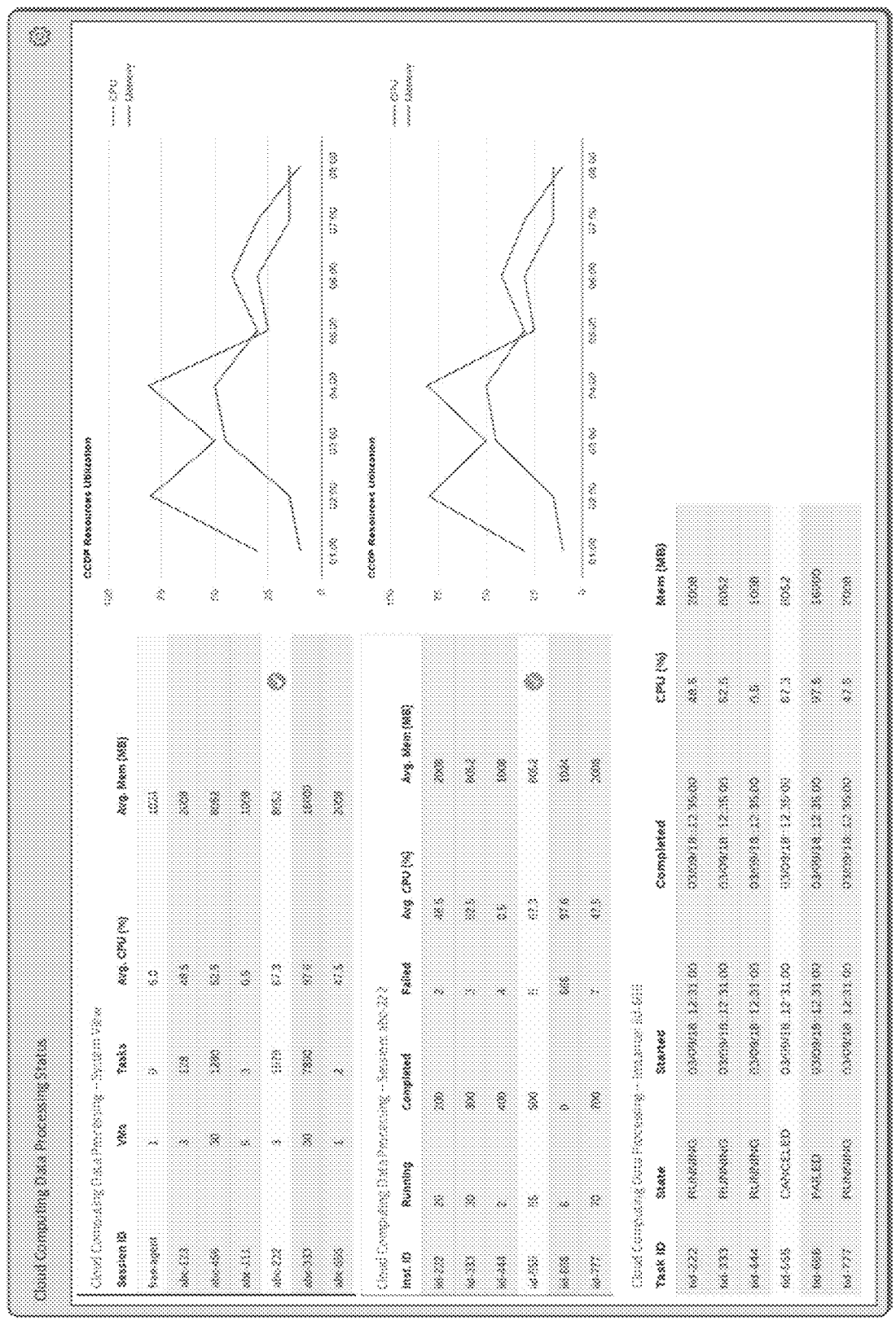
FIG. 4B is an example graphical user interface disclosed herein.

FIG. 4B illustrates a graphical user interface showing status and resources utilization as described herein. The graphical user interface of FIG. 4B can show multiple tasks, multiple VMs, or multiple similar or dissimilar cloud solutions in terms of aggregated resources and aggregated resource utilization, unlike other task interfaces which show only utilization in, e.g., a single VM.

The methods and systems associated with managing cloud services as described herein also may be practiced via communications embodied in the form of program code that is transmitted over some transmission medium, such as over electrical wiring or cabling, through fiber optics, or via, any other form of transmission, wherein, when the program code is received and loaded into and executed by a machine, such as an EPROM, a gate array, a programmable logic device ((PLD), a client computer, or the like, the machine becomes a device for implementing content delivery as described herein. When implemented on a general-purpose processor, the program code combines with the processor to provide a unique device that operates to invoke the functionality of a streaming system.

While cloud service management systems and methods have been described in connection with the various examples of the various figures, it is to be understood that other similar implementations may be used or modifications and additions may be made to the described examples of a system or method without deviating therefrom. For example, one skilled in the art will recognize that a streaming system as described in the instant application may apply to other environments combining both local and network elements and components. Therefore, cloud service management systems and methods as described herein should not be limited to any single example, but rather should be construed in breadth and scope in accordance with the appended claims and other disclosed embodiments.

What is claimed is:

1. A cloud service management system, comprising:
an image database configured to store a virtual machine image; and
an engine configured to:
receive a task request for a first task for a dedicated solution and second task for a shared solution, the first task having dedicated task parameters and the second task having shared task parameters, wherein the dedicated solution is a cloud environment that handles a task under the control of one user or customer and the shared solution is a cloud environment that handles a task under the control of shared users or customers;
upon receiving the task request, access the dedicated and shared task parameters respectively for each of the two tasks;
encode each of the respective dedicated task parameters of the first task into a target format necessary for the dedicated solution;
store each of the respective encoded dedicated task parameters into a respective dedicated first reply-to field for the dedicated solution;
encode each of the respective shared task parameters of the second task into a common format for the shared solution;
store each of the respective encoded shared task parameters into a respective shared second reply-to field for the shared solution;
instantiate a first virtual machine in the dedicated solution based on the virtual machine image in the image database, wherein the first virtual machine contains an agent;
instantiate a second virtual machine in the shared solution based on the virtual machine image in the image database, wherein the second virtual machine contains a gateway;
based on the encoded task parameters, determine whether a hybrid running mode is being used for the two tasks; and
responsive to determining the hybrid running mode:
transmit the encoded dedicated task parameters to the agent;
transmit the encoded shared task parameters to the gateway;
based on the encoded dedicated task parameters, assign, by the agent, the first task on the first virtual machine;
based on the encoded shared task parameters, assign, by the gateway, the second task on the second virtual machine;
execute the respective first and second tasks by the respective first and second virtual machines;
based on the execution of the first task and the dedicated first reply-to fields, return first status information to a common receiver; and
based on the execution of the second task and the shared second reply-to fields, return second status information to the common receiver.

2. The cloud service management system of claim 1, wherein the engine is further configured to deploy the virtual machine image in a stored image format to the second virtual machine of another cloud service, wherein the stored image format conforms to formatting for the other cloud service.

3. The cloud service management system of claim 1, wherein the engine is further configured to direct the agent associated with the first virtual machine to image the first virtual machine to the virtual machine image according to a deployed image format.

4. The cloud service management system of claim 1, wherein the engine is further configured to provide a deployed image format to the gateway associated with the shared solution.

5. The cloud service management system of claim 1, wherein the engine is further configured to:
receive a second virtual machine image; and
store the second virtual machine image in the image database.

6. The cloud service management system of claim 5, wherein the engine is further configured to:
convert the second virtual machine image from a native image format to a stored image format.

7. A method, comprising:
storing a virtual machine image in an image database;
receiving a task request for a first task for a dedicated solution and second task for a shared solution, the first task having dedicated task parameters and the second task having shared task parameters, wherein the dedicated solution is a cloud environment that handles a task under the control of one user or customer and the shared solution is a cloud environment that handles a task under the control of shared users or customers;
upon receiving the task request, accessing the dedicated and shared task parameters respectively for each of the two tasks;
encoding each of the respective dedicated task parameters of the first task into a target format necessary for the dedicated solution;
storing each of the respective encoded dedicated task parameters into a respective dedicated first reply-to field for the dedicated solution;
encoding each of the respective shared task parameters of the second task into a common format for the shared solution;
storing each of the respective encoded shared task parameters into a respective shared second reply-to field for the shared solution;
instantiating a first virtual machine in the dedicated solution based on the virtual machine image in the image database, wherein the first virtual machine contains an agent;
instantiating a second virtual machine in the shared solution based on the virtual machine image in the image database, wherein the second virtual machine contains a gateway;
based on the encoded task parameters, determining whether a hybrid running mode is being used for the two tasks; and
responsive to determining the hybrid running mode:
transmitting the encoded dedicated task parameters to the agent;
transmitting the encoded shared task parameters to the gateway;
based on the encoded dedicated task parameters, assigning, by the agent, the first task on the first virtual machine;

based on the encoded shared task parameters, assigning, by the gateway, the second task on the second virtual machine;
executing the respective first and second tasks by the respective first and second virtual machines;
based on the execution of the first task and the dedicated first reply-to fields, returning first status information to a common receiver; and
based on the execution of the second task and the shared second reply-to fields, returning second status information to the common receiver.

8. The method of claim 7, wherein identifying a new virtual machine for instantiation includes identifying a virtual machine capability.

9. The method of claim 7, further comprising:
locating the virtual machine image in the image database.

10. The method of claim 9, further comprising:
determining that a stored image format of the virtual machine image for a new virtual machine does not conform to formatting for one of the dedicated solution or the shared solution before converting the virtual machine image.

11. The method of claim 7, wherein in a case of the dedicated solution, the virtual machine image is deployed by directing the agent associated with the first virtual machine to instantiate the virtual image for the first virtual machine according to a deployed image format.

12. The method of claim 7, wherein in a case of the shared solution, the virtual machine image is deployed by providing a deployed image format to the gateway for the second virtual machine associated with the shared solution.

13. The method of claim 7, further comprising:
deploying the virtual machine image from the image database in a stored image format to the second virtual machine, wherein the stored image format conforms to formatting for a cloud service of the shared solution.

14. The method of claim 7, further comprising:
receiving the virtual machine image; and
storing the virtual machine image.

15. The method of claim 14, further comprising:
converting the virtual machine image from a native image format to a stored image format.

16. Non-transitory computer readable media storing instructions that when executed by a processor are configured to perform operations comprising:
storing a virtual machine image in an image database;
receiving a task request for a first task for a dedicated solution and second task for a shared solution, the first task having dedicated task parameters and the second task having shared task parameters, wherein the dedicated solution is a cloud environment that handles a task under the control of one user or customer and the shared solution is a cloud environment that handles a task under the control of shared users or customers;
upon receiving the task request, accessing the dedicated and shared task parameters respectively for each of the two tasks;
encoding each of the respective dedicated task parameters of the first task into a target format necessary for the dedicated solution;
storing each of the respective encoded dedicated task parameters into a respective dedicated first reply-to field for the dedicated solution;
encoding each of the respective shared task parameters of the second task into a common format for the shared solution;
storing each of the respective encoded shared task parameters into a respective shared second reply-to field for the shared solution;
instantiating a first virtual machine in the dedicated solution based on the virtual machine image in the image database, wherein the first virtual machine contains an agent;
instantiating a second virtual machine in the shared solution based on the virtual machine image in the image database, wherein the second virtual machine contains a gateway;
based on the encoded task parameters, determining whether a hybrid running mode is being used for the two tasks; and
responsive to determining the hybrid running mode:
transmitting the encoded dedicated task parameters to the agent;
transmitting the encoded shared task parameters to the gateway;
based on the encoded dedicated task parameters, assigning, by the agent, the first task on the first virtual machine;
based on the encoded shared task parameters, assigning, by the gateway, the second task on the second virtual machine;
executing the respective first and second tasks by the respective first and second virtual machines;
based on the execution of the first task and the dedicated first reply-to fields, returning first status information to a common receiver; and
based on the execution of the second task and the shared second reply-to fields, returning second status information to the common receiver.

17. The non-transitory computer readable media of claim 16, further storing instructions that when executed by a processor are configured to perform operations comprising:
identifying a new virtual machine for instantiation based on a scale-up request, wherein a deployed image format is based on the scale-up request.

18. The non-transitory computer readable media of claim 16, further storing instructions that when executed by a processor are configured to perform operations comprising:
identifying a new virtual machine for instantiation, wherein the identifying of the new virtual machine identifying a virtual machine capability.

19. The non-transitory computer readable media of claim 18, further storing instructions that when executed by a processor are configured to perform operations comprising:
locating the virtual machine image for the new virtual machine in the image database.

20. The non-transitory computer readable media of claim 16, further storing instructions that when executed by a processor are configured to perform operations comprising:
deploying the virtual machine image based on a Quality of Service ("QoS") requirement, wherein the QoS requirement is a locality requirement.

* * * * *